(12) United States Patent
Gauld et al.

(10) Patent No.: US 6,327,154 B1
(45) Date of Patent: *Dec. 4, 2001

(54) BATTERY CASE FOR PCMCIA CARD MODEM WITH ANTENNA

(75) Inventors: Craig S. Gauld, Vancouver; Trent McKeen, North Vancouver; Ronald J. Vanderhelm, Surrey, all of (CA)

(73) Assignee: Sierra Wireless, Inc., Richmond (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/187,392

(22) Filed: Nov. 6, 1998

(51) Int. Cl.[7] .............................. H05K 1/14; H05K 7/14; H04B 1/38
(52) U.S. Cl. ....................... 361/737; 361/814; 439/946; 235/492; 455/90
(58) Field of Search .................................. 361/814, 752, 361/736, 737; 439/946; 235/492; 340/825.44; 455/89, 90, 344–347; D14/138, 242

(56) References Cited

U.S. PATENT DOCUMENTS

| D. 355,173 | * | 2/1995 | Fenton et al. ..................... D14/107 |
| 5,361,061 | * | 11/1994 | Mays et al. ..................... 340/825.44 |
| 5,617,449 | | 4/1997 | Masahiko ............................. 375/222 |
| 5,628,055 | | 5/1997 | Stein . | |
| 5,689,821 | * | 11/1997 | Shimazaki .............................. 455/89 |
| 5,845,217 | * | 12/1998 | Lindell et al. ........................ 455/557 |
| 6,026,119 | * | 2/2000 | Funk et al. ........................... 375/222 |

FOREIGN PATENT DOCUMENTS

| 0862278A2 | 9/1998 | (EP) . |
| 94/09460 | 4/1994 | (WO) . |
| 94/21088 | 9/1994 | (WO) . |

* cited by examiner

Primary Examiner—Jayprakash N. Gandhi
(74) Attorney, Agent, or Firm—Burns Doane Swecker & Mathis LLP

(57) ABSTRACT

A detachable battery pack is connected to a personal computer card modem at the same side as an antenna. An advantage of this system is that the detachable battery pack can be added and removed from the personal computer card without affecting the antenna connection to the personal computer card. The antenna need not be connected to the personal computer card through the battery pack.

26 Claims, 6 Drawing Sheets

BATTERY CASE FOR PCMCIA CARD MODEM WITH ANTENNA

BACKGROUND OF THE INVENTION

1. Field of the Invention

The present invention relates to wireless modems, especially wireless modems on personal computer cards.

2. State of the Art

Personal computer cards, particulary cards conforming to the Personal Computer Memory Card International Association (PCMCIA) standard have become a mainstay of mobile computing. A variety of devices are available in the PCMCIA format, including memory cards, modems, disk, drives, etc. The development of mobile computing has resulted in an increased demand in particular for wireless modems.

PCMCIA cards come in multiple form factors, including in order of increasing thickness, type I, type II, and type III cards. Because of the significant transmit power requirements of wireless modems, existing PCMCIA-based modems are provided with a rather bulky battery enclosed within an extension to a standard type II card. The antenna of the wireless modem is typically positioned at the end of the battery extension to the PCMCIA card.

It is desired to have an improved battery case for PCMCIA card modem having an antenna.

SUMMARY OF THE PRESENT INVENTION

The inventors have determined that placing the antenna at the end of the battery extension for a PCMCIA card has multiple disadvantages. In particular, an antenna feed-through has to be added to the battery pack to connect the antenna signals to the personal computer card. If the battery is a detachable battery, each time the battery pack is removed from the PCMCIA card, the antenna would have to be removed from the battery pack and attached to the personal computer card. The required connectors for the antenna and/or the antenna feed-through to the battery pack can be quite costly.

The present invention generally relates to a system wherein the antenna is positioned in between the detachable battery pack and the PCMCIA card. Such an arrangement is unusual because the antenna is not positioned at the end of the personal computer card/battery pack unit. The advantage of the system of the present invention is that the battery pack can be attached and detached to the personal computer card without modifying the position of the antenna. Additionally, the detachable battery pack can be connected to the same side of the personal computer card as the antenna. The advantage of this arrangement is that typically the personal computer card is connected to a personal computer or portable device with only a single side exposed to the user. In the present invention, both the antenna and the detachable battery pack can be connected to the single exposed side of the PCMCIA card.

In one embodiment, the detachable battery pack has an extended region for the connector. The antenna on the personal computer card can be positioned over the connector region of the battery pack.

DETAILED DESCRIPTION OF THE PREFERRED EMBODIMENT

Figure 1A:
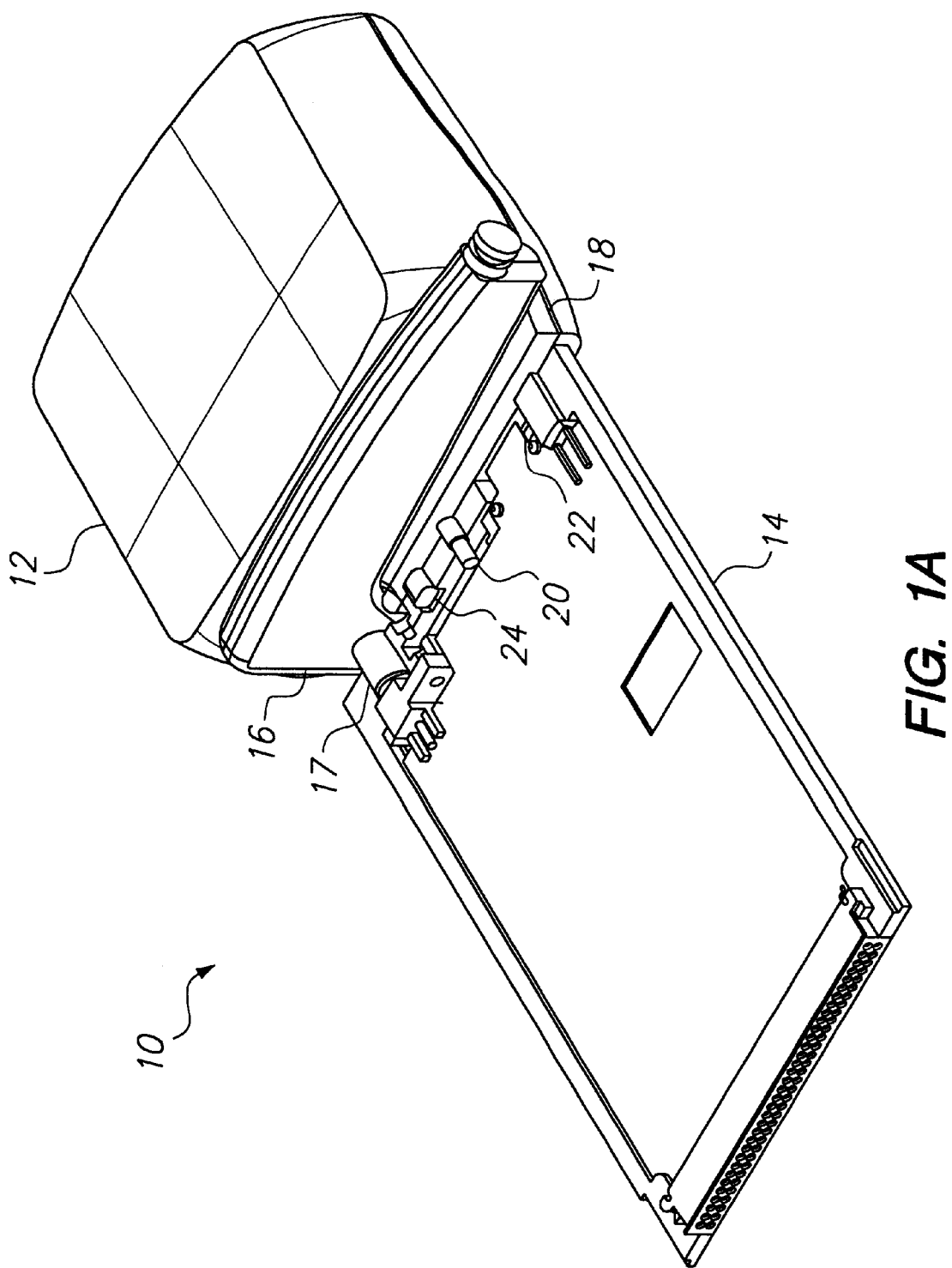
FIGS. 1A and 1B are diagrams illustrating the connection between a personal computer card and the detachable battery.
Figure 1B:
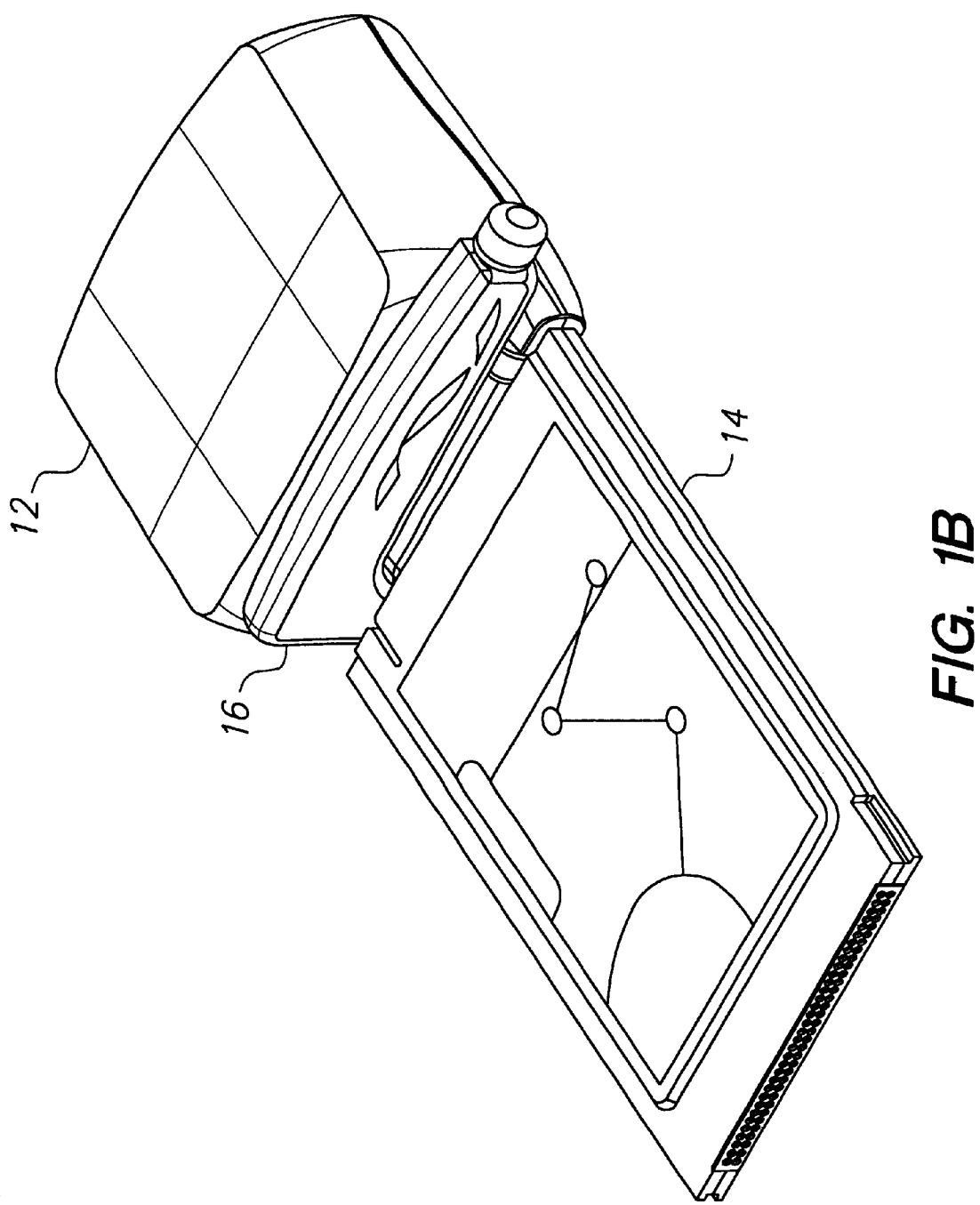

FIG. 1A shows a detachable battery pack 12 connected to the base of a personal computer card 14. Only the base of the personal computer card 14 is shown in this view to show the interconnection of the detachable battery pack 12 and personal computer card 14. FIG. 1B shows a complete personal computer card 14.

An antenna 16 is positioned in between the detachable battery pack 12 and the personal computer card 14. As discussed above, this has the advantage that the signals to the antenna 16 need not sent across the battery pack 12. Additionally, the antenna 16 can be attached to a single location, whether or not the battery pack 12 is connected to the PC card.

A preferred embodiment of the antenna 16 for use with the present invention is described in the patent application entitled "Dual Mode Antenna for Personal Computer Card" having a Ser. No. 09/187074, filed Nov. 6, 1998 which is incorporated herein. Details of the battery pack 12 and PC card modem 14 are described in the applications entitled "Smart Personal Computer Card Battery Pack" Ser. No. 09/160498, filed Nov. 24, 1998 and "Personal Computer Card Power Management" Ser. No. 09/160501, filed Nov. 24, 1998 which are both incorporated herein by reference.

The detachable battery pack 12 has a connector region 18 which connects to the personal computer card 14. In a preferred embodiment, this connector region 18, is positioned underneath antenna 16. The connector includes a screw 20, electrical connections 22, and a stabilizing pin 24. Screw 20 can be used to connect the detachable battery pack 12 to the personal computer card 14. The stabilizing pin 24 protects the electrical connections 22 from rotational forces. The electrical connections 22 can include power and control lines. The antenna 16 is attached by a rotatable coax connector 17 to the PC card 14.

Figure 2:
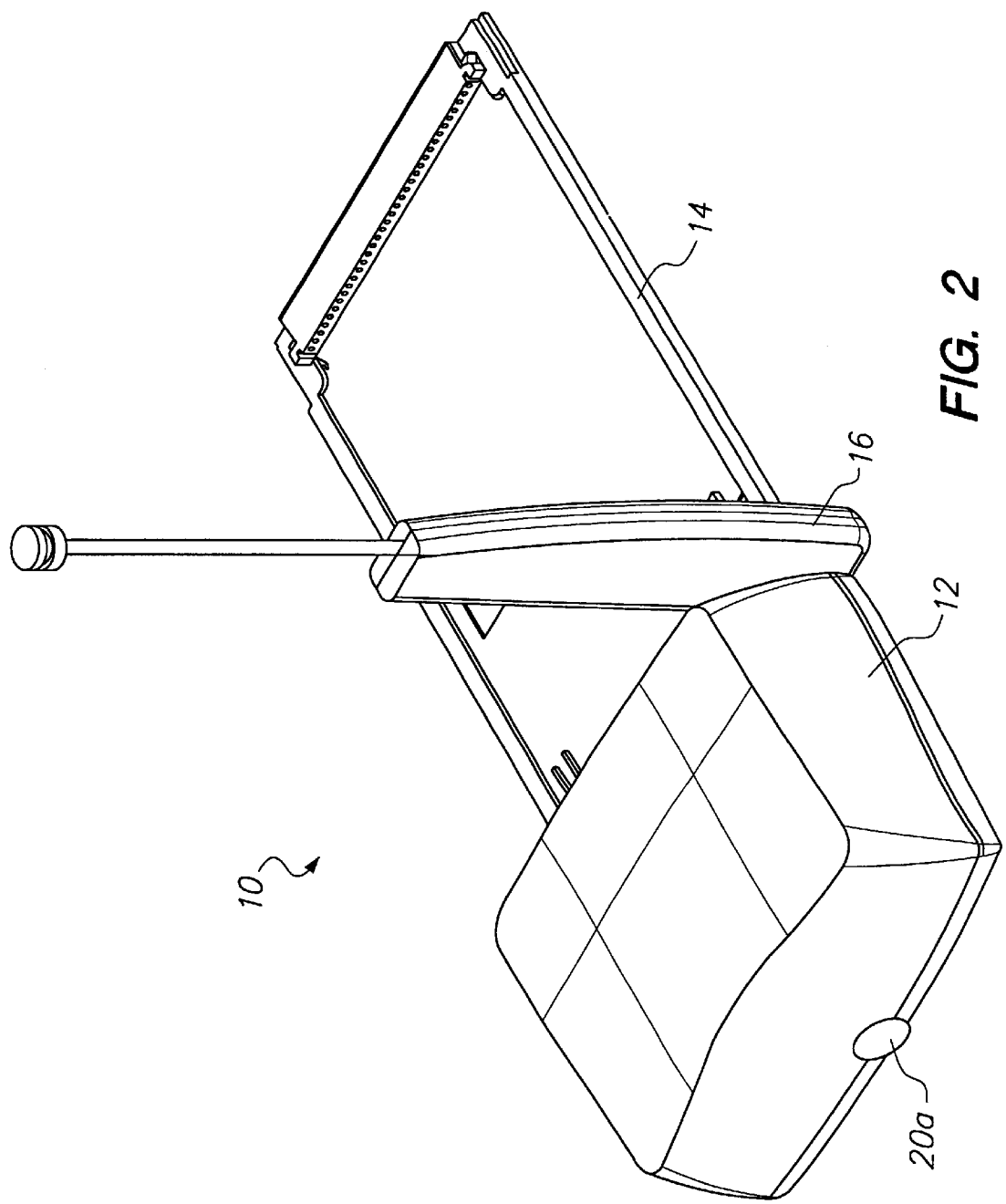
FIG. 2 is a diagram which illustrates the detachable battery connected to the personal computer card with the battery antenna extended.

FIG. 2 shows an alternate view of the system 10 of FIG. 1. In this view, the antenna 16 is rotated upwards and extended. This view also shows the screwhead 20a for screwing the battery case 12 into the PC card 14.

Figure 3A:
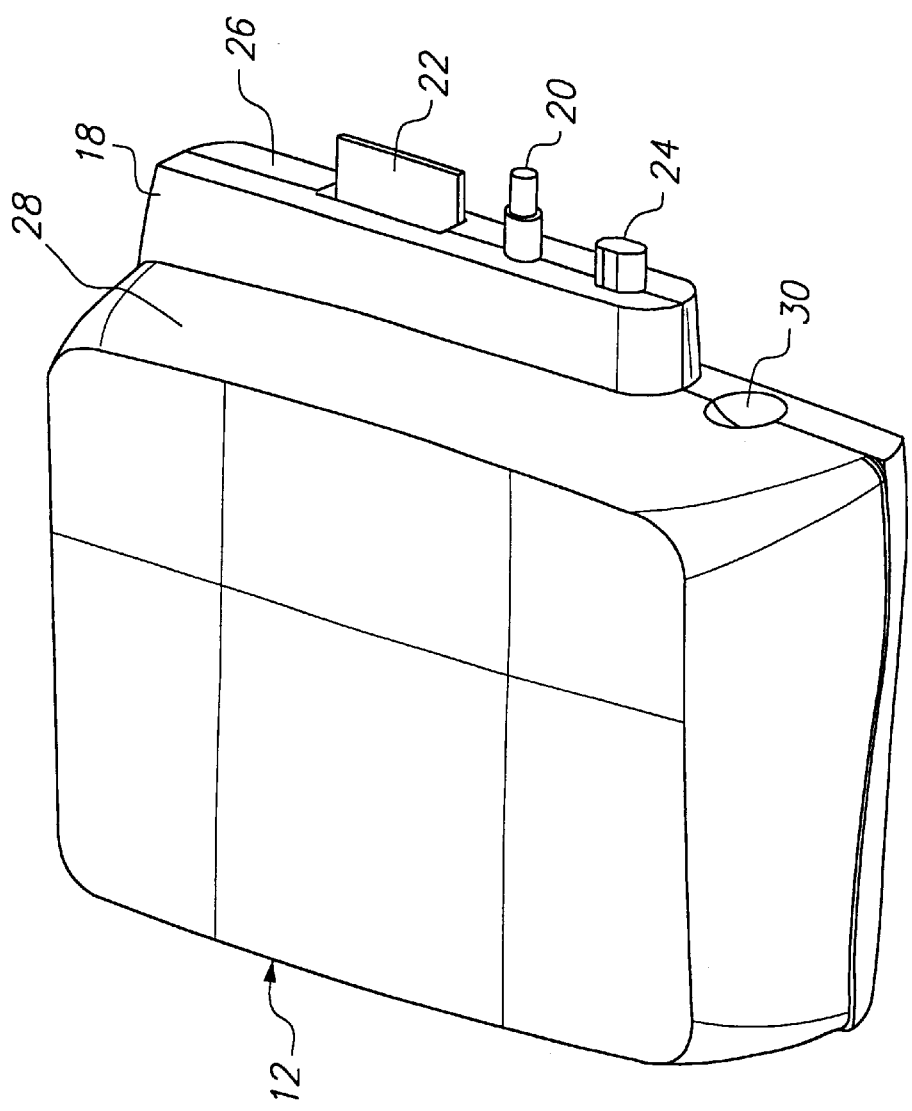
FIGS. 3A and 3B are diagrams of the detachable battery pack.

FIG. 3A is a diagram of the front side of battery case 12. This view shows the extended connector region 18 with the electrical connections 22, screw 20, and stabilizing pin 24. Also shown is the indentation 21 that allows an indicator light on the personal computer card to be seen. The indentation 21 also has raised edges for the antenna to rest on in the parked position. The battery pack is preferably comprised of two plastic shells 26 and 28 which surround the battery contents. The shell portions 26 and 28 can be snapped together or an adhesive can be applied to the shell portions' edges.

Also shown in FIG. 3A is the indentation 30 in the battery case 12 which nests with a portion of the antenna. The antenna can engage the ridge 30a to click into the fully erect position.

Figure 3B:
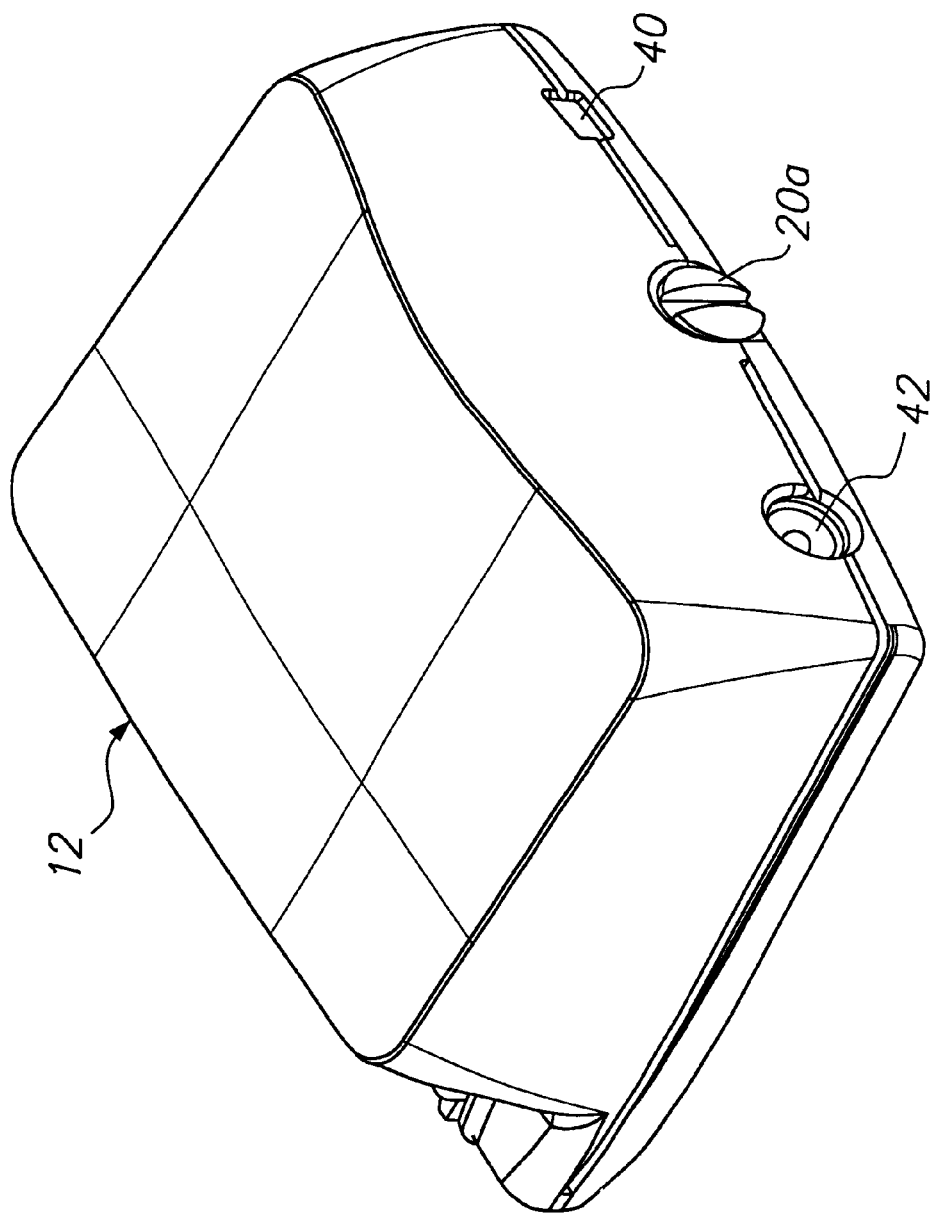

FIG. 3B is a diagram of the rear of the detachable battery case. Screwhead 20a is shown. Indicator light 40 indicates the status of the battery. A port 42 for a DC adaptor is also shown.

Figure 4:
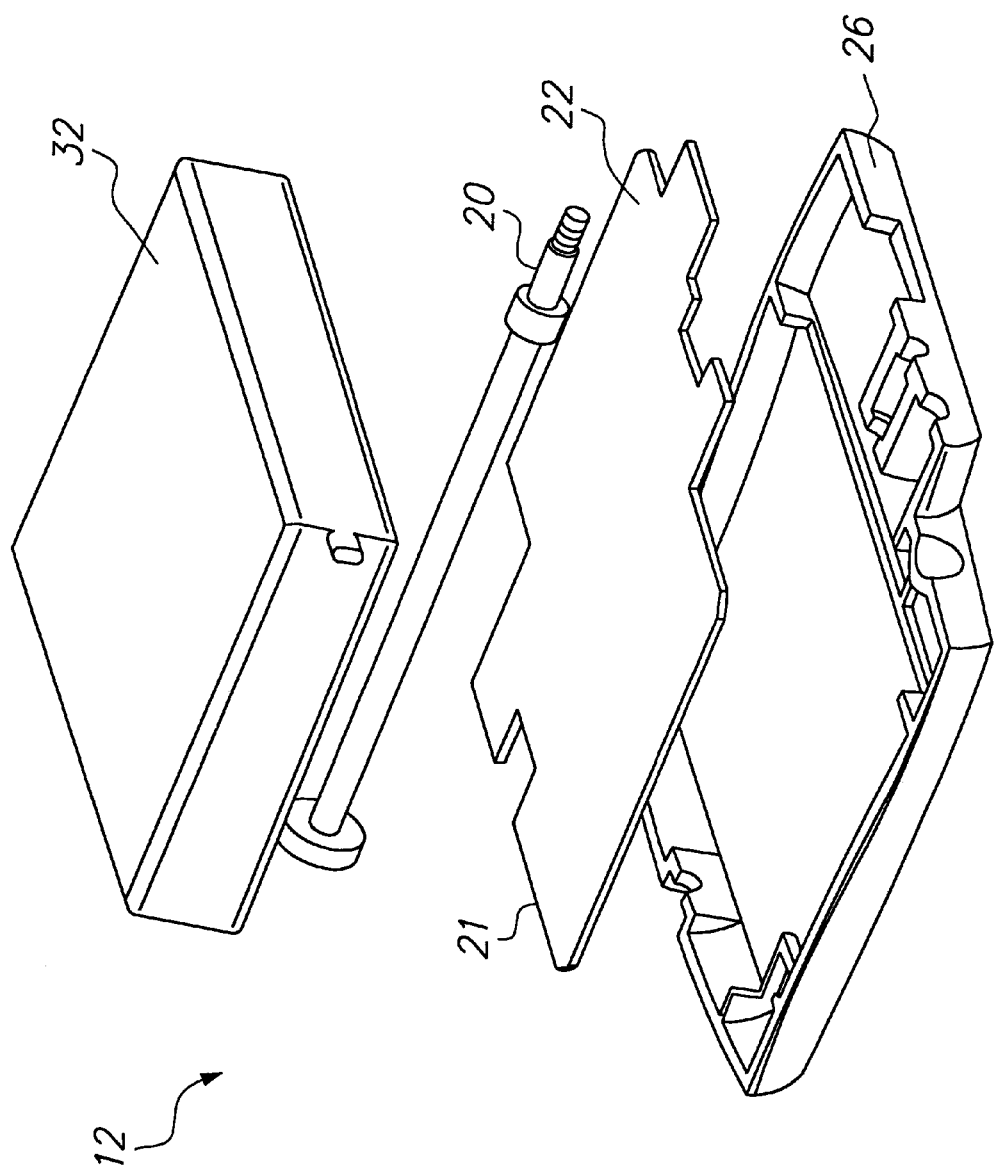
FIG. 4 is a partial exploded view of the detachable battery pack.

FIG. 4 is a partial exploded view of the detachable battery pack 12 of the present invention. A circuit board 22, which is connected to the battery 32, includes the electrical connection region 22. The circuit board also contains the logic used to control the battery pack as described in the patent application, "Smart Personal Computer Card Battery Pack", referenced above. Screw 20 passes through the battery case to hold the battery case to the personal computer card.

It would appreciated by those of ordinary skill in the art that the invention can be embodied in other specific forms without departing from the spirit or central character thereof. The presently disclosed embodiments are therefore considered in all respects to be illustrative in not restrictive. The scope of the invention is to be indicated by appended claims, rather than foregoing description, and all changes which come within the meaning and range of equivalents thereof are intended to be embraced herein.

What is claimed is:

1. A system comprising:
   a personal computer card having two ends;
   a rotatable antenna attached to a first end of the personal computer card using a rotatable connector on the personal computer card; and
   a detachable battery pack, the detachable battery pack being attached to the first end of the personal computer card, wherein the antenna is interposed between the battery pack and the personal computer card.

2. The system of claim 1, wherein the antenna is detachable from the personal computer card.

3. The system of claim 1, wherein the antenna is fixed to the personal computer card.

4. The system of claim 1, wherein the battery pack has an indented portion.

5. The system of claim 1, wherein the antenna is extendable.

6. The system of claim 1, wherein the battery pack has a connector for connecting to the personal computer card.

7. The system of claim 6, wherein the connector includes power and control lines.

8. The system of claim 7, wherein the power and control lines are on a circuit board.

9. The system of claim 6, wherein the connector includes a support screw.

10. The system of claim 6, wherein the connector includes a stabilizing rod.

11. The system of claim 6, wherein when the battery pack is connected to the personal computer card, the antenna is positioned over the connector.

12. The system of claim 1, wherein the personal computer card is a PCMCIA card.

13. A system comprising:
    a personal computer card having two ends with a rotatable antenna fixedly attached at a first end; and
    a detachable battery pack, the detachable battery pack having an actuator adapted to engage the personal computer card to attach the battery pack to the first end of the personal computer card, the actuator adjustable to disattach the battery pack from the personal computer card without removing the rotatable antenna from the personal computer card.

14. A system comprising:
    a personal computer card having two ends with a rotatable antenna attached at a first end; and
    a detachable battery pack, the detachable battery pack having an actuator adapted to engage the personal computer card to attach the battery pack to the first end of the personal computer card, the actuator adjustable to disattach the battery pack from the personal computer card without removing the rotatable antenna from the personal computer card, wherein the antenna is rotatably attached to the personal computer card so that the antenna can be positioned in a first position parallel to the end of the personal computer card and in-between the detachable battery pack and the personal computer card and can be positioned in a second position perpendicular to the end of the personal computer card.

15. The system of claim 14, wherein the antenna is extendable.

16. The system of claim 14, wherein the battery pack has a connector for connecting to the personal computer card.

17. The system of claim 16, wherein the connector includes power and control lines.

18. The system of claim 16, wherein the personal computer card is a PCMCIA card.

19. The system of claim 16, wherein the connector includes power and control lines.

20. The system of claim 16, wherein the personal computer card is a PCMCIA card.

21. The system of claim 14, wherein the actuator is a screw.

22. The system of claim 14, wherein when the battery pack is attached to the personal computer card, the antenna is interposed between the battery pack and the remainder of the personal computer card.

23. The system of claim 14, wherein the antenna is extendable.

24. The system of claim 14, wherein the battery pack has a connector for connecting to the personal computer card.

25. The system of claim 14, wherein the actuator is a screw.

26. The system of claim 14, wherein when the battery pack is attached to the personal computer card, the antenna is interposed between the battery pack and the remainder of the personal computer card.

* * * * *